(12) United States Patent
Collaud et al.

(10) Patent No.: US 6,307,870 B1
(45) Date of Patent: Oct. 23, 2001

(54) PROCESS FOR TRANSMITTING DIGITIZED PAYLOAD AND SIGNALLING DATA OVER A CHANNEL

(75) Inventors: Yves Collaud, Turgi; Dominique Luisier, Nyon, both of (CH)

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 08/989,777

(22) Filed: Dec. 12, 1997

(30) Foreign Application Priority Data

Dec. 14, 1996 (DE) ............................................. 196 52 187

(51) Int. Cl.$^7$ ....................................................... H04J 3/12
(52) U.S. Cl. .................................................................. 370/528
(58) Field of Search ..................................... 370/522, 523, 370/524, 527, 528, 529, 236; 455/557

(56) References Cited

U.S. PATENT DOCUMENTS

| | | |
|---|---|---|
| 4,071,692 | 1/1978 | Weir et al. . |
| 4,750,173 | * 6/1988 | Bliirtgen ................ 370/111 |
| 4,855,999 | * 8/1989 | Chao ..................... 370/112 |
| 5,031,173 | 7/1991 | Short et al. . |
| 5,123,014 | 6/1992 | Federkins et al. . |
| 5,146,457 | * 9/1992 | Veldhuis et al. ........ 370/111 |
| 5,291,484 | 3/1994 | Tomita et al. . |
| 5,440,542 | 8/1995 | Procter et al. . |
| 5,794,160 | * 8/1998 | Ezuriko ................. 455/557 |

FOREIGN PATENT DOCUMENTS

| | | |
|---|---|---|
| 230947A1 | 12/1985 | (DE) . |
| 3723187A1 | 1/1989 | (DE) . |
| 3737306A1 | 5/1989 | (DE) . |
| 4337593A1 | 5/1995 | (DE) . |
| 4435833A1 | 5/1995 | (DE) . |
| 0117644A1 | 9/1984 | (EP) . |
| 2 066 024 A | 7/1981 | (GB) . |
| 2125255 | 2/1984 | (GB) . |
| WO95/34965 | 12/1995 | (WO) . |

OTHER PUBLICATIONS

International Search Report dated Feb. 11, 2000.
"Systemes de Telecommunications", Fontoilliet, Traite d'Electricite, pp. 214–224.

* cited by examiner

*Primary Examiner*—Chau Nguyen
*Assistant Examiner*—Alexander Boakye
(74) *Attorney, Agent, or Firm*—Burns, Doane, Swecker & Mathis, L.L.P.

(57) ABSTRACT

A method for transmitting digitized payload data and signalling data over a common channel. The signalling data are multiplexed with the payload data using a suitable coding. The signalling bytes are preceded by at least one header bit, and confusion between the payload data and the header byte is prevented by inverting at least one bit of the payload data byte when a payload data byte corresponding to the header byte occurs.

6 Claims, 1 Drawing Sheet

PROCESS FOR TRANSMITTING DIGITIZED PAYLOAD AND SIGNALLING DATA OVER A CHANNEL

FIELD OF THE INVENTION

The present invention relates to the field of communications technology. More particularly, the present invention relates to a method for transmitting digitized payload and signalling data over a common channel.

BACKGROUND OF THE INVENTION

In telephony, there exists the problem that payload data (for example, acoustic signals such as voice signals) and signalling data, such as information concerning receiver status, digital signals entered via the keypad, ringing signals, etc., must be transmitted over the same channel or the same information transmission medium. Current telephony systems use a pulse code-modulated (PCM) channel, i.e. all data is transmitted digitally. Such a PCM transmission method is described, for example, in the textbook "Traité d'Electricit," Volume XVIII of "Systémes de Télécommunications" by Pierre-Gérard Fontolliet, published by Ecole Polytechnique Fédéral de Lausanne. Both payload data and signalling data, which may occur simultaneously, must be transmitted using the same single transmission medium.

There are currently two predominant standards for transmitting signalling data over a standard PCM channel: In the European PCM basic system (ITU-T G.732), the signalling data of 30 telephone channels are multiplexed time slots (off-band signalling). This system is known as "Channel Associated Signalling" (CAS). According to the American PCM basic system (ITU-T G.733), signalling data for 24 telephone channels are distributed using the "Bit-Stealing" method over all 24 channels. But both of the above described methods can be used only in multichannel systems. It would be desirable to be able to transmit signalling data and payload data, with relatively low distortion and bandwidth loss, over any single channel.

SUMMARY OF THE INVENTION

The present invention solves the above-described problems, and achieves other advantages, by providing for a method for transmitting digitized payload data and signalling data over one channel with relatively low distortion.

According to an exemplary embodiment of the invention, signalling data is multiplexed with payload data by using suitable coding. For this purpose, signalling bytes can be preceded by at least one header byte. Further, to prevent misinterpretation of a payload data byte corresponding to a header byte, at least one bit of the payload data is inverted for a payload data byte corresponding to the header byte. This results in some distortion which can be minimized by inverting the least significant bit (LSB) of the payload data byte.

The distortion can be further minimized by transmitting multiple header bytes consecutively. In order to ensure that the combination of the multiple header bytes can be distinguished from possible payload data bytes, header bytes are selected which correspond to the maximum value of the payload data and differ only by their sign bit. In the receiver, the payload data byte that was received last is repeated when each header byte is received.

The method according to the present invention makes it possible to transmit signalling data and payload with low distortion over a common channel, and improves the utilization of existing channel capacities.

BRIEF DESCRIPTION OF THE DRAWINGS

The invention is explained in more detail below with reference to the drawings, in which like reference designations indicate like elements, and in which.

DETAILED DESCRIPTION

Figure 1:
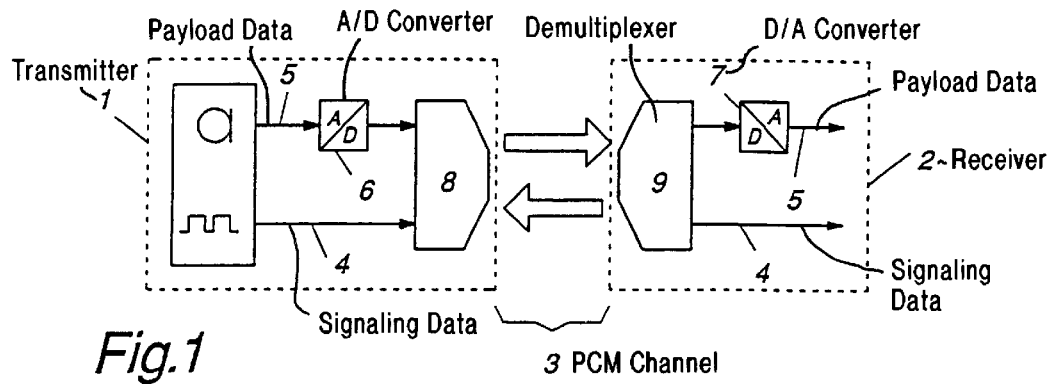
FIG. 1 shows a block diagram of a transmission system in which the method according to the invention can be implemented.

FIG. 1 shows a block diagram of a transmission system in which the method according to the invention can be implemented. In such a system, both payload data 5 and signalling data 4 are transmitted over a channel 3 between a transmitter 1 and a receiver 2. The data may originate, for example, from a telephone. In this example, the payload or voice data are recorded, for example, by a microphone and are digitized in an A/D converter 6. The signalling data, which in modem telephones is in digital form, may, for example, be position data of the telephone receiver (on or off the hook), keypad input, ringing signals, etc. The channel 3 is a pulse code modulated (PCM) channel.

Both payload data and signalling data are preferably transmitted over the same channel. For this purpose, the transmitter 1 is provided with a multiplexer 8, and the receiver 2 is provided with a demultiplexer 9. The multiplexer 8 places the two types of data onto the channel 3 and the demultiplexer takes them from the channel. If signalling data occur simultaneously with the transmission of payload data, this creates the problem of how to ensure that the receiver does not interpret the detected data as payload data but rather as signalling data. For this purpose, a reserved header byte is created when signalling data occur, and precedes the signalling data during transmission. This ensures that when the header byte is detected in the receiver, the following byte is interpreted as a signalling byte. But it may be that a payload data byte that corresponds to the header byte occurs within the payload data. To prevent such payload data from being misinterpreted as a header byte, at least one bit of the corresponding payload data byte is inverted prior to transmission. Preferably, to cause the least amount of distortion, the inverted bit is the LSB of the payload data byte. This method ensures that the receiver 2 recognizes only actual header bytes.

Distortion can be further reduced when two header bytes are sent consecutively. This is particularly true when the two bytes each correspond to a maximum value of the payload data bytes and differ only by their sign, since this combination rarely occurs.

In order to avoid an interruption in the detection of the payload data in the receiver when the header byte is received, the payload data value that was last received is repeated once when the header byte is received. This ensures the continuity of the payload data with little distortion.

The signalling data will not necessarily comprise a complete byte, but can be only a few bits. In this situation, the higher value bits in an incomplete signalling byte can be allocated for payload data. In a realized exemplary embodiment, only five bits were necessary for the signalling data. The other three bits were available for payload data. The five lowest value bits were thus allocated to the signalling data, while the three highest value bits were used for payload data. This allows a further reduction of distortion caused by the transmission of the signalling data.

Figure 2:
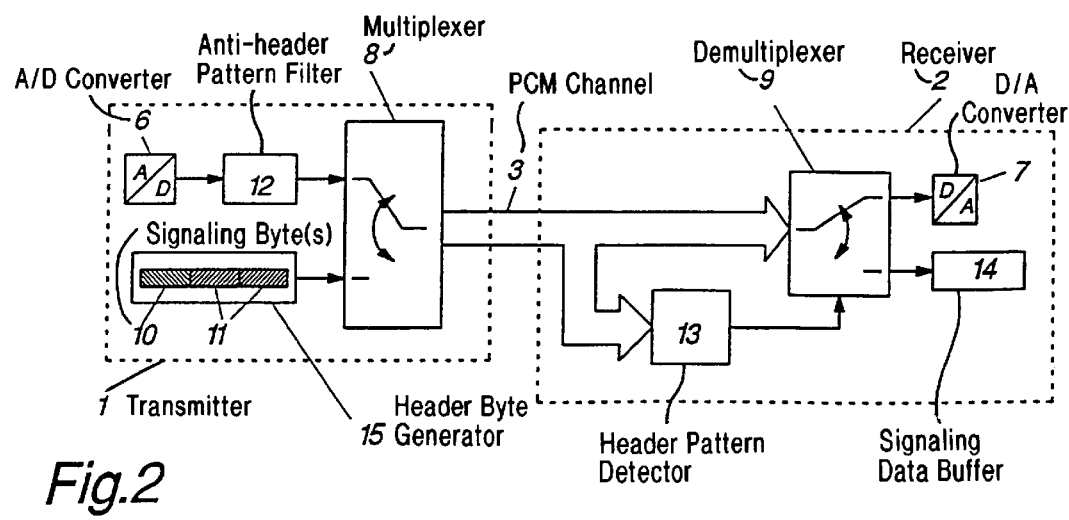
FIG. 2 shows further details of the transmitter and receiver of the transmission system of FIG. 1.

FIG. 2 shows the transmitter 1 and the receiver 2 in more detail. The transmitter is, for example, a telephone; the receiver can be, for example, a telephone network or a telephone switching office. The transmitter 1 is provided with an AID converter 6 which digitizes the payload data 5, if not already in digitized form, and feeds them to an anti-header pattern filter 12. This filter detects whether a payload data byte corresponds to the header byte, and inverts at least one bit of the payload data byte if there is such a correspondence. The header byte generator 15 generates header bytes 11 when the signalling data is generated, generates signalling bytes 10 (which can include both payload data and signalling data, as described above), and then places the header bytes 11 before the corresponding signalling byte 10. Multiplexer 8 sends the data over channel 3.

The receiver is provided with a header pattern detector 13 which detects whether a header byte is present, and causes demultiplexer 9 to forward signalling data to a signalling data buffer 14, and payload data to a D/A converter 7. In addition, the header pattern detector ensures that the last-received payload data byte is repeated when each header byte is received.

The invention therefore enables the transmission of signalling data and payload data over a mutual channel with very low distortion. Naturally, the described invention is not limited to telephony, but can be used advantageously for all transmission systems in which sporadically occurring signalling or other data must be transmitted over the same channel as continuously transmitted payload data.

What is claimed is:

1. A method for transmitting first digital data and sporadically occurring second digital data over a channel, comprising the steps of:

inserting, at a transition, only when the second digital data occurs, two header patterns before the second digital data is transmitted;

inverting at least one bit of the first digital data when a first digital data pattern corresponds to the two header patterns; and transmitting the two header patterns consecutively.

2. The method of claim 1, wherein the two header patterns correspond to a maximum possible value of the first digital data and differ only by a sign bit.

3. The method of claim 1, wherein the at least one bit is a least significant bit of the first digital data.

4. A method for transmitting first digital data and sporadically occurring second digital data over a channel, comprising the steps of:

inserting, at a transition, only when the second digital data occurs, at least one header pattern before the second digital data is transmitted;

inverting at least one bit of the first digital data when a first digital data pattern corresponds to the at least one header pattern; and repeating the first digital data which was received prior to the header pattern.

5. A method for transmitting first digital data and sporadically occurring second digital data over a channel, comprising the steps of:

inserting, at a transition, only when the second digital data occurs, at least one header pattern before the second digital data is transmitted; and inverting at least one bit of the first digital data when a first digital data pattern corresponds to the at least one header pattern;

wherein the second digital data is allocated to lower value bits in a byte and portions of the first digital data are allocated to higher value bits in the byte.

6. The method of claim 5, wherein the second digital data is allocated to the five lowest value bits in the byte, and the portions of the first digital data are allocated to the three highest value bits in the byte.

* * * * *